Feb. 20, 1940.  A. BOEDEKER  2,190,971
BOTTLE BREAKER
Filed Jan. 20, 1938
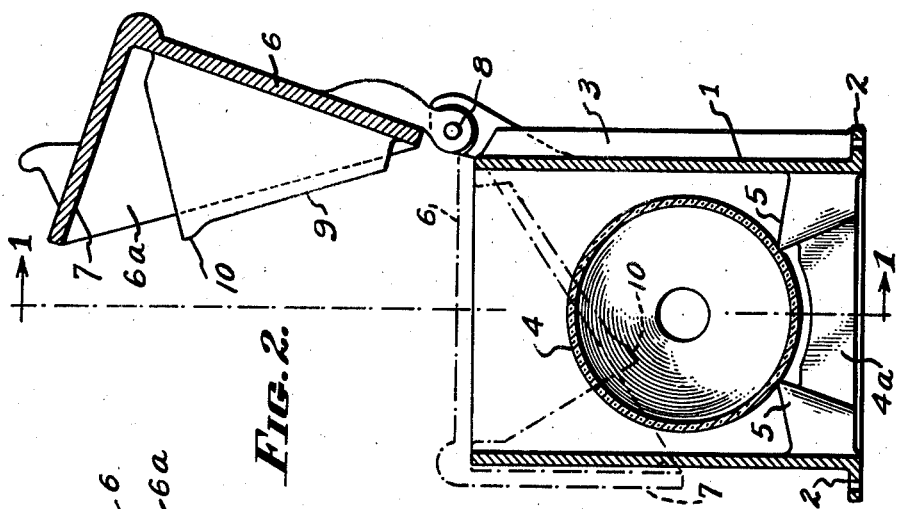
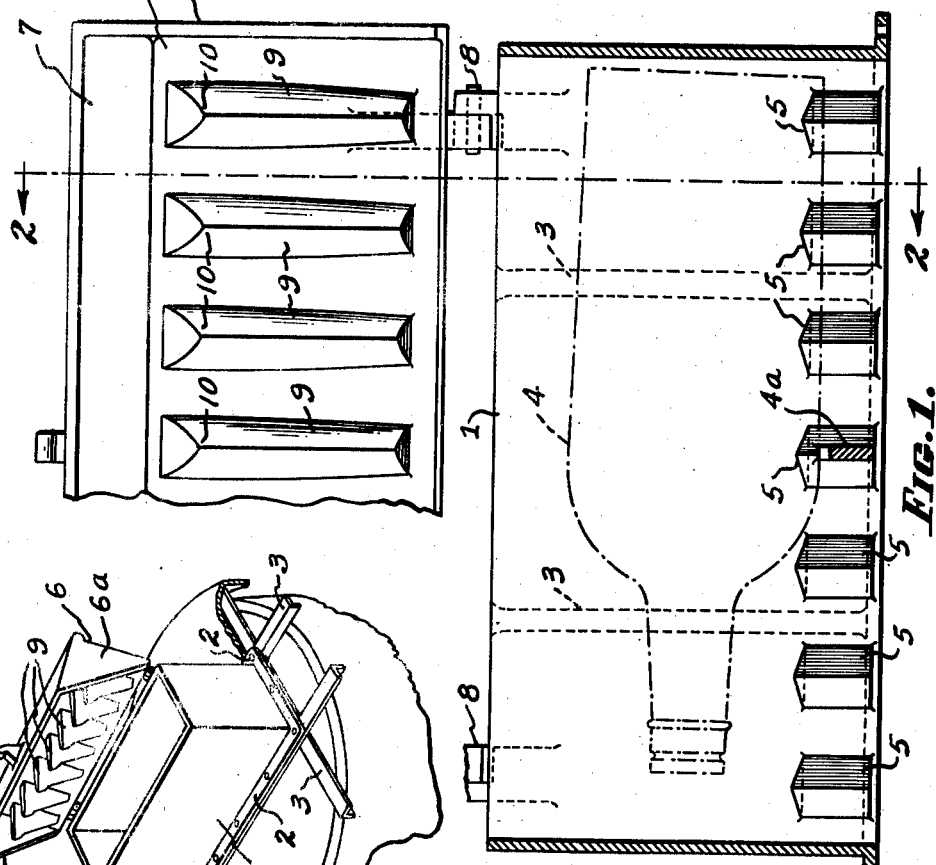
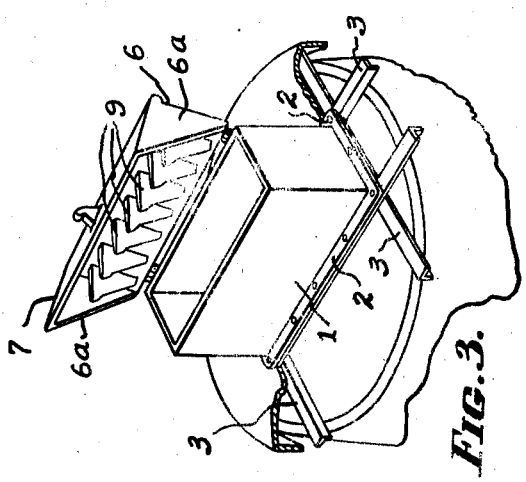
INVENTOR.
ANTHONY BOEDEKER.
BY
Allen & Allen
ATTORNEYS.

Patented Feb. 20, 1940

2,190,971

UNITED STATES PATENT OFFICE 2,190,971

BOTTLE BREAKER

Anthony Boedeker, Cincinnati, Ohio

Application January 20, 1938, Serial No. 185,937

2 Claims. (Cl. 83—93)

My invention relates to devices for the breaking of bottles in liquor dispensing establishments.

The requirements in this connection involve the following factors: There must by law in many jurisdictions, be a considerable number of bottles that must be broken to avoid refilling, the broken glass is a vendible commodity and should be in relatively small pieces because of the bulk of material for transportation in case only some small portion of a complete bottle is broken away, there should be as great as possible an elimination of danger from flying bits of glass injuring the operator, the glass when broken should be finally located in the receptacle from which it is collected, and the entire arrangement should be such as to discourage the habit of throwing other trash into the said ultimate receptacle.

It is my object to provide a bottle breaking apparatus which provides for all of these features, and I propose to illustrate and describe a preferred embodiment of my invention in the following drawing and specification, the novelty inherent in the disclosure being set forth in the appended claims to which reference is made.

In the drawing:

Figure 1 is a section on the line 2—2 of Fig. 2, showing my construction.

Fig. 2 is a section on the line 2—2 of Fig. 1.

Fig. 3 is a perspective showing my device in use.

In my preferred form of device, I provide a casing 1, which has an open bottom and an open top. This casing will preferably be of cast metal and both heavy and strong. For convenient mounting thereof on a receptacle such as a barrel, the walls of the casing are flanged as at 2, and may be bolted to some convenient frame, such as is illustrated at 3, which serves to mount it over an opening in the top of a barrel or box, which is the ultimate container for the broken glass. Ribs 3 may be formed externally or internally of the casing for strengthening it. The casing is of a size to readily receive a bottle such as is illustrated at 4.

Along the lower portion of the lengthwise walls of the casing I form lugs 5, in a series along each of the walls. These lugs are tapered upwardly at their upper portions, preferably terminating in points, and also will preferably taper outwardly and downwardly as to their inwardly facing walls so as to leave as clear a space as practical at the open bottom of the casing. The bottles to be broken are set into the casing and will rest on the points of the supporting lugs. Preferably a single cross rib 4a is provided between the lengthwise walls of the device.

The lid of the casing will be heavy, and preferably made of cast metal. This lid has a main body 6, end walls 6a, and a front wall 7. It is mounted to the casing by butt hinges 8, and when lowered down over the casing will not only close the open top thereof but will have walls which extend down over the three exposed casing walls. For a convenient expression the lid is generally referred to by me as a flanged lid, and the parts 6, 6a, and 7, as the flanges.

Preferably cast with the lid are a series of breaker jaws 9. These jaws project from the inner face of the lid, and as shown may be generally triangular in shape, and terminate in points 10. The exact shape of the breaker jaws are not essential, except that it is desirable that the most advanced portions thereof (shown by me as points) should strike a bottle when the lid is flung down over the casing.

As shown in Fig. 2, when the operator places a bottle into the casing so that it rests on the supporting lugs, and then forcibly slams the lid down over the casing, the bottle will be broken into relatively small pieces by reason of the interaction of the breaker jaws and the supporting lugs. The broken glass will then fall down through the bottom of the casing. While the breaking is taking place the open top of the casing is fully protected by the flanged lid, the flanges of which will come past the upper edges of the casing walls before the bottle is shattered.

With the device set on top of a barrel, or other container, with a hole in its upper head, located beneath the open bottom of the casing, the shower of broken glass will fall into the barrel or container, without danger to any one. A much greater weight of glass in the small pieces can be collected in the container because of the small pieces than if the neck of the bottle merely were broken away. There is no danger to the operator, such as is incident to breaking a bottle with a hammer or gripping the neck and smashing it against the side of the barrel which is the customary practice today.

The apparatus is necessarily heavy, but this is an advantage, since in the position following use, the lid of the device will be down, and the user will not go to the trouble of lifting it up to drop other trash into the barrel or other container. Also the weight will be such that with some suitable supporting frame, or by sufficient extension of the flanges on the casing to serve as a support, there will be no necessity of screwing or bolting the device to a container.

I have contemplated placing of springs to normally force the lid toward closed position, but do not find this to be necessary. It is preferable to use the butt hinges so that the lid can be raised to an open position at which it will stand, so that the bottle can be dropped into the casing, after which the lid can be flung over, and will shatter the bottle.

Having thus described my invention, what I claim as new and desire to secure by Letters Patent is:

1. In a bottle breaking device the combination of an oblong casing which is open top and bottom and of a length adapted to receive a bottle lying on its side within the box, interspaced supports extending inwardly from the side walls and terminating short of the middle of the casing, said supports located to support a bottle on its side so that the same will be entirely within the casing, a lid for the said casing hinged to one of the longer walls thereof, and having flanges which when the lid is lowered will lie alongside of the three walls of the casing not occupied by the hinge, and interspaced bottle breaking jaws projecting from the inside of the lid located and arranged so as to strike a bottle supported within the casing when the lid is lowered thereover, said projecting jaws and said lid flanges being such that by the time the jaws start to strike a bottle within the casing, the lid flanges will have begun to pass the upper edges of the casing.

2. In a bottle breaking device the combination of an oblong casing which is open top and bottom and of a length adapted to receive a bottle lying on its side within the box, interspaced supports extending inwardly from the side walls and terminating short of the middle of the casing, said supports located to support a bottle on its side so that the same will be entirely within the casing, a lid for the said casing hinged to one of the longer walls thereof, and having flanges which when the lid is lowered will lie alongside of the three walls of the casing not occupied by the hinge, and interspaced bottle breaking jaws projecting from the inside of the lid located and arranged so as to strike a bottle supported within the casing when the lid is lowered thereover, said projecting jaws and said lid flanges being such that by the time the jaws start to strike a bottle within the casing, the lid flanges will have begun to pass the upper edges of the casing, the supports within the casing shaped to present a point engagement to the sides of the bottle, and the jaws within the lid also shaped to present point contacts to the bottle.

ANTHONY BOEDEKER.